United States Patent [19]

Lentino

[11] Patent Number: 5,083,376
[45] Date of Patent: Jan. 28, 1992

[54] THRUST BEARING ARRANGEMENT FOR A POWER TOOL TRANSMISSION

[75] Inventor: Lynn E. Lentino, Westminster, Md.

[73] Assignee: Black & Decker Inc., Newark, Del.

[21] Appl. No.: 730,516

[22] Filed: Jul. 12, 1991

Related U.S. Application Data

[60] Continuation of Ser. No. 585,571, Sep. 20, 1990, abandoned, which is a division of Ser. No. 270,726, Nov. 14, 1988, Pat. No. 4,976,164.

[51] Int. Cl.$^5$ .............................................. B23D 49/04
[52] U.S. Cl. ............................................ 30/392; 74/50
[58] Field of Search ................................. 30/392–394; 74/50

[56] References Cited

U.S. PATENT DOCUMENTS

| | | | |
|---|---|---|---|
| 2,630,148 | 4/1949 | Ferguson. | |
| 2,713,271 | 7/1955 | Dodegge. | |
| 3,160,902 | 12/1964 | Aymar. | |
| 3,204,479 | 9/1963 | Magos. | |
| 3,657,813 | 4/1972 | Knight | 30/166.1 |
| 3,677,313 | 7/1972 | Hessler | 74/50 X |
| 3,962,924 | 6/1976 | Glover et al. | |
| 4,385,443 | 5/1983 | O'Banion | 30/393 |
| 4,550,501 | 11/1985 | Moores et al. | 30/393 |
| 4,676,001 | 6/1987 | Wagner | 30/393 |

FOREIGN PATENT DOCUMENTS 1073682 9/1954 France.
2180791 4/1987 United Kingdom.

OTHER PUBLICATIONS

European Search Report Dated Sep. 5, 1990.

Primary Examiner—Douglas D. Watts
Attorney, Agent, or Firm—Dennis A. Dearing; John D. Del Ponti; Charles E. Yocum

[57] ABSTRACT

In the compact transmission of a hand-held reciprocating power saw, conversion of rotary to reciprocating motion is through a speed reducing bevel gear set (crown wheel and pinion) closely coupled by an eccentric drive pin in the crown wheel to a reciprocating saw blade carrier bar. A guide or bearing plate extending between the crown wheel and the saw blade carrier bar does double duty, guiding and supporting the saw blade carrier bar on one side and, on its opposite side, providing a thrust surface for the crown wheel. The crown wheel engages the guide plate through a thrust ring about equal in diameter to the diameter of the crown wheel. In this way, the shallow crown wheel may be positioned, supported and stabilized entirely by two simple bearings—a large diameter plain thrust bearing of essentially no radial capacity and a short radial bearing subject to virtually no bending or thrust loads. In an alternative embodiment the guide plate is eliminated and the reciprocating carrier bar receives the thrust load of the crown wheel.

16 Claims, 3 Drawing Sheets

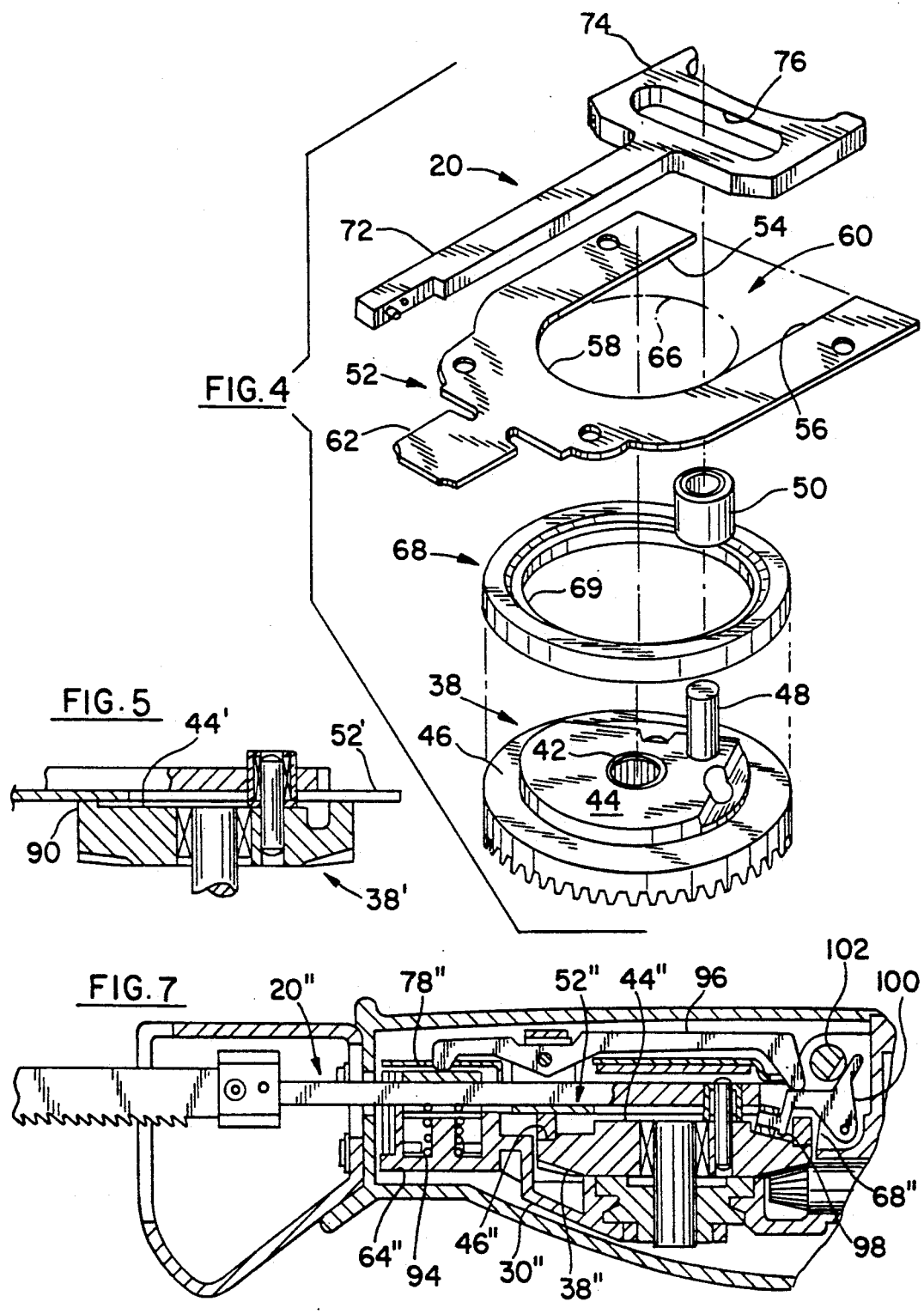

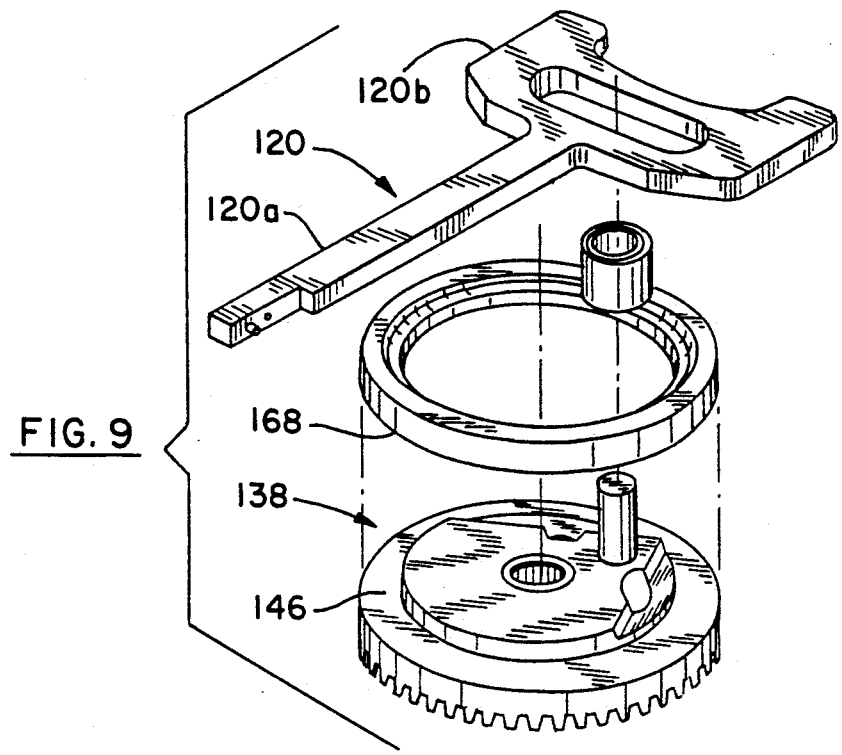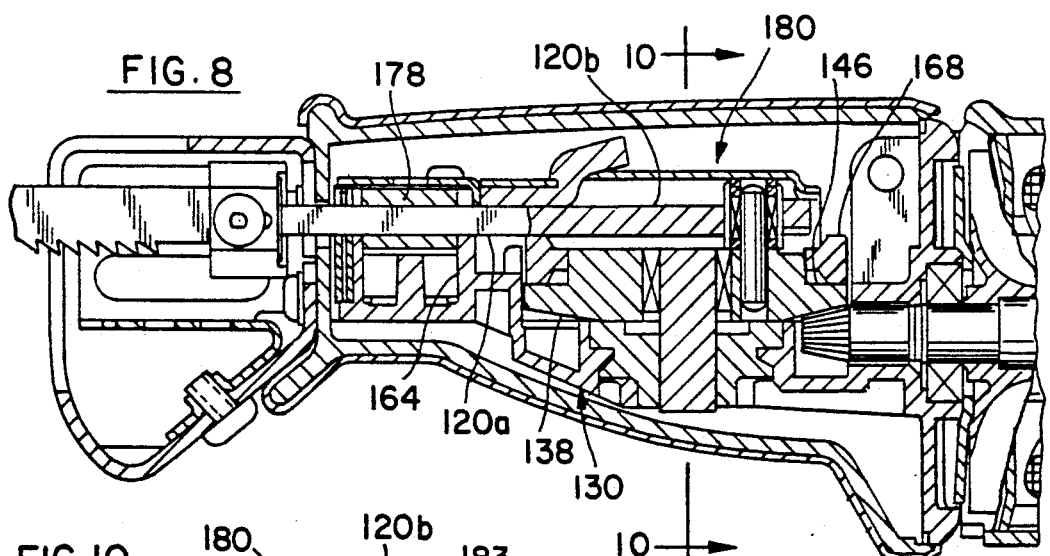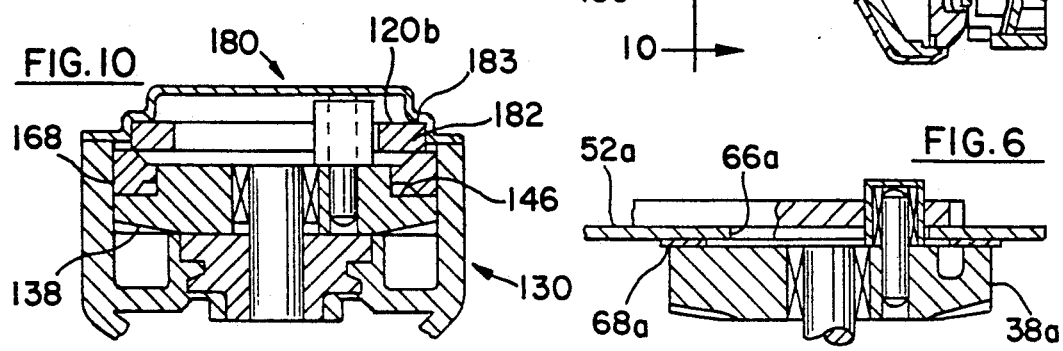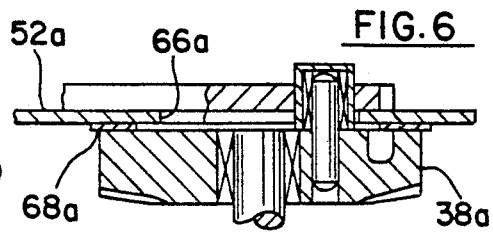

THRUST BEARING ARRANGEMENT FOR A POWER TOOL TRANSMISSION

This application is a continuation of divisional application Ser. No. 07/585,571, filed Sept. 20, 1990, now abandoned. Ser. No. 07/585,571 is division of application Ser. No. 07/270,726, filed Nov. 14, 1988 now U.S. Pat. No. 4,976,169.

BACKGROUND OF THE INVENTION

The invention concerns power tools having a multi-component transmission including at least one speed reducing bevel gear set, interposed between a driving motor and an output member. More particularly, the invention concerns a thrust bearing arrangement for a crown wheel in a tool of this type with a reciprocating output, such as a reciprocating power saw.

Reciprocating power saws typically use a relatively simple transmission with a bevel gear set input in which a pinion drives a crown wheel for a one stage speed reduction. An eccentrically mounted pin on the crown wheel engages some form of yoke connected to a saw blade carrier extension for converting the input rotary motion to a reciprocating output. In hand held reciprocating saws it is particularly desirable to minimize overall weight and bulk and especially to achieve compactness of the transmission. In use, the transmission housing is generally used as a forward hand-grip or hold.

Knight (U.S. Pat. No. 3,657,813), in a tree pruning saw, exemplifies the transmission arrangement outlined above but in a relatively deep configuration (as measured from the top of the saw blade carrier extension to the base of the crown wheel mounting). Part of this depth comes from a radial bearing arrangement for the crown wheel which straddles the crown wheel to provide a stable mount for it at the expense of compactness of the transmission overall.

In the motion-converting hand drill attachment of Dodegge (U.S. Pat. No. 2,713,271), the connection from the crown wheel eccentric pin to the saw blade carrier extension yoke is much more compact (in depth). But, although Dodegge's disclosure lacks details, it appears that, again, a radial bearing configuration of substantial axial extent is relied on for crown wheel stability so that the transmission remains relatively deep or bulky. It appears also that thrust loads imposed in crown wheel 91 by pinion 103 are absorbed by boss 94 of the housing H.

O'Banion (U.S. Pat. No. 4,385,443) and Moores (U.S. Pat. No. 4,550,501), both discloses hand-held reciprocating power saws of similar configuration. In particular, to minimize depth in the forward hand grip area (which is also the transmission housing), both have adopted, for the crown wheel, a radial bearing of limited axial extent and a simple thrust bearing comprising a "cap" retained on the upper end of the fixed crown wheel bearing spindle by a single retaining screw. This may be called an open bevel gear case arrangement in that the crown wheel spindle or journal and its thrust bearing are cantilevered from a gear case frame member below the crown wheel and there is no frame or support structure above the top or back face of the crown wheel. For transferring thrust load from the crown wheel to say, the frame or housing of the transmission there is no obvious compact alternative to this cantilevered arrangement, given that the saw blade carrier or its extension reciprocates closely above the crown wheel. Use of a live spindle for the crown wheel and placing a thrust bearing at its lower end would again undesirably deepen the transmission in the hand grip area.

In the conventional cantilevered thrust bearing arrangement of O'Banion and Moores, the diameter of the thrust cap is necessarily limited by the presence of the eccentrically mounted drive pin extending upwardly from the back face of the crown wheel. The limited dimensions of the crown wheel bearing surfaces, both radial and thrust, in relation to crown wheel diameter make stability of the crown wheel uncertain. Even before wear has occured an accumulation of manufacturing tolerances can result in looseness allowing the crown wheel to rock, affecting gear mesh and concentrating loadings in the bearing surfaces and the retaining screw to such an extent that rapid wear occurs and durability of the saws in heavy duty applications is not always acceptable.

SUMMARY OF THE INVENTION

Accordingly it is an object of the invention, in a power tool such as a reciprocating power saw using a compact and simple transmission in which a rotating input is converted to a reciprocating output by way of a speed reducing bevel gear set comprising a spindle and crown wheel, to improve the stability and integrity of support of the crown wheel economically and without scarificing compactness of the transmission.

This object may be achieved in part by arranging for an effective thrust bearing, between the crown wheel and the frame or housing of the transmission, of greater effective diameter than is conventional. Preferably the thrust load imposed in the crown wheel in operation is absorbed by direct compressive loading into a member forming part of, or rigidily connected to, the transmission frame or housing, rather than by a cap or washer cantilevered from the crown wheel spindle. Alternatively, in an arrangement for relatively lighter duty applications, the thrust load imposed in the crown wheel may be absorbed by another active member of the transmission.

In particular the severe limitation on thrust bearing maximum diameter imposed by the rotating eccentrically mounted drive pin may be circumvented by providing a "thrust ring" outside the swing radius of the drive pin, the thrust ring having a diameter, say, approximately equal to the outside diameter of the crown wheel, and forming a thrust resisting connection between the crown wheel and a stable surface connected to our forming part of the frame. The contact surface is preferably of sufficiently large diameter to stabilize the crown wheel in its plane of rotation (acting as a pure thrust bearing, with no radial component). The radial bearing of the crown wheel then need serve only as a pure radial bearing, to center the crown wheel and need be only of limited axial extent. To maximize the compactness advantage of this general configuration, the crown wheel may be relatively shallow and the radial bearing, of limited axial extent, may have an end close to, or nearly coplanar with the back or thrust face of the crown wheel. This arrangement can meet design objectives of drive stability and durability, compactness and economy of manufacture, using only a single relatively large diameter (pure) effective thrust bearing and a (pure) radial bearing of limited axial extent. The diameter of the thrust bearing is preferably such that no contribution is required from the radial bearing to stabilize and control rocking of the crown wheel in its plane of rotation.

The connection between the crown wheel and "frame" at the thrust absorbing surface is preferably annular and may be completed, for example, by a loose ring concentrically carried by the crown wheel, or a ring integral with the crown wheel, or an annulus or portion of an annulus forming part of or attached to the frame or housing.

In the alternative embodiment for lighter duty applications referred to above, the crown wheel and thrust ring configuration may be as just described (except that the "annulus attached to the frame or housing" is no longer applicable). For "the stable surface connected to or forming part of the frame" a surface of a moving member, stabilized and backed up in its movement by a guide connected to or forming part of the frame, is substituted.

An advantage of the invention is that very adequate thrust bearing life may be achieved without the expense of friction reducing elements such as rollers or balls. A thrust ring of oil impregnated powdered metal may advantabeously be used. Or more expensive roller bearings may be used with commensurate cost increase.

In a preferred embodiment the frame related member, to one surface of which the thrust of the crown wheel is transferred, may be a guide or bearing plate which on its opposite side provides part of the guidance and support for the reciprocating saw blade carrier or its extension. Thus this frame related member serves a dual bearing or control purpose.

In the alternative embodiment referred to above the moving member may be a reciprocating member driven by the crown wheel and disposed so that the crown wheel thrust ring bears directly on one side of it. Thus, the reciprocating member guide, through the reciprocating member, "positions" the crown wheel as well as guiding the reciprocating member.

It is an advantage of the invention that it is compatible with both saws in which the motion is simple reciprocation, and those in which the motion of the blade is a combination of reciprocation and transverse motion, and where the transverse motion is initiated by a cam surface or track on the back face of the crown wheel, concentric with the thrust ring or surface.

The invention has been described with reference to certain reciprocating saw embodiments, but of course it may have wider application, for example, in any power tool having a transmission including a rotary input to a bevel gear set, and a reciprocating output function and where compactness and minimum weight are always desirable.

BRIEF DESCRIPTION OF DRAWINGS

FIG. 4 is a further enlarged exploded perspective view of major components of the transmission.

FIG. 5 is a partial view similar to FIG. 2 showing a first alternative embodiment of the invention.

FIG. 6 is a view similar to FIG. 5 of a third embodiment of the invention.

FIG. 7 is also a sectioned side view similar to FIG. 2 of a fourth embodiment of the invention, in which a cam driven transverse motion is added to the straight reciprocation of the saw blade.

FIG. 8 is also a sectioned side view similar to FIG. 2 of a fifth embodiment of the invention.

FIG. 9 is an enlarged, exploded, perspective view of major components of the transmission of FIG. 8.

FIG. 10 is a transverse cross section taken approximately on line 10—10 of FIG. 8.

DESCRIPTION OF THE PREFERRED EMBODIMENT

Figure 1:
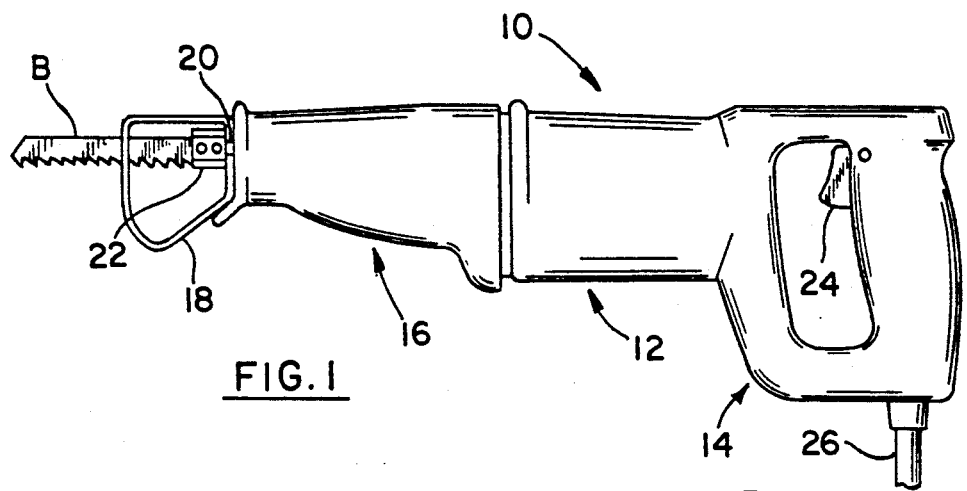
FIG. 1 is a side view of a reciprocating power saw embodying the invention.

A hand-held electric motor driven reciprocating power saw 10, usefully embodying the invention, is shown in FIG. 1. A motor housing 12 and a handle 14 jointly form the main bulk of the tool while a transmission housing 16, tapered and shaped for convenient hand gripping, extends forward from the motor housing 12. At its forward end, the transmission housing 16 carries a workpiece engaging shoe 18. Saw blade carrier 20 extends forwardly from the transmission housing 16 and includes a saw blade clamp 22 for removably attaching a saw blade B to the power saw. By means of a trigger switch 24 in the handle 14, electrical power brought to the tool by line cord 26 may be selectively applied to the power saw motor (not shown). A saw, generally similar to that of the present embodiment, is described in detail in U.S. Pat. No. 4,550,501 Moores, also assigned to the assignee of the present invention and hereby incorporated by reference, and the construction and operation of the saw will be described here only in sufficient detail to support the description of the present invention.

Figure 3:
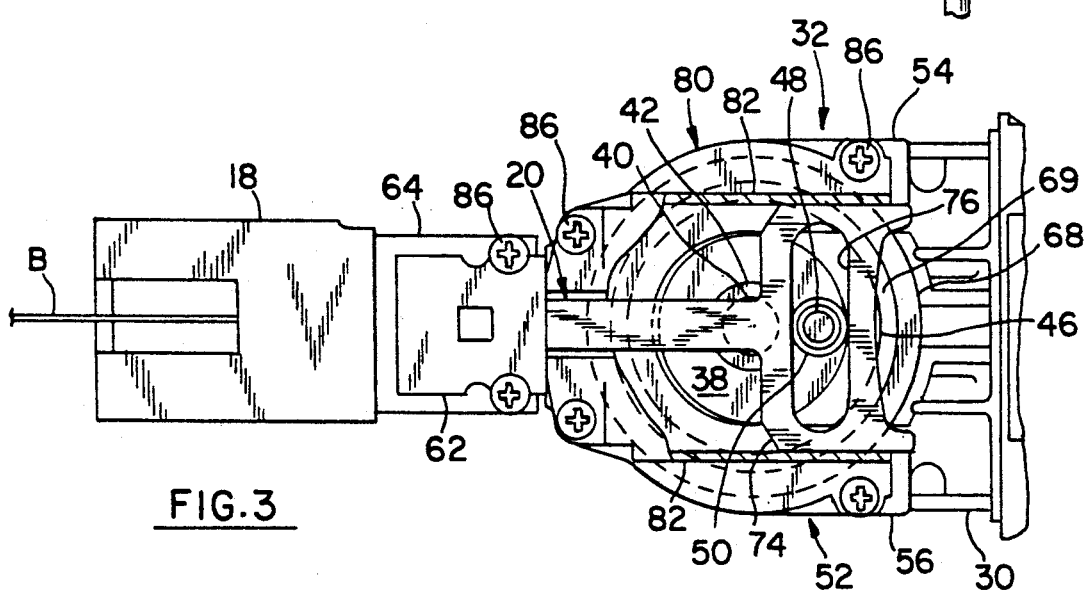
FIG. 3 is an overhead view of the forward portion of the tool with the transmission housing removed and a portion of a transmission cover plate cut away to reveal details of the transmission.
Figure 2:
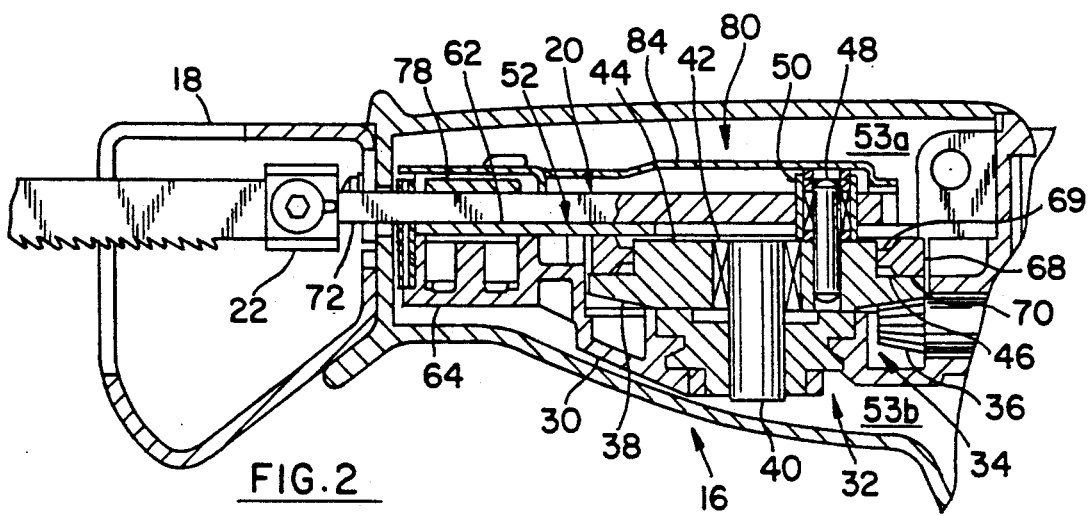
FIG. 2 is an enlarged side view in center line cross section of the forward portion of the power saw of FIG. 1, particularly showing power transmission components but with some details omitted for clarity.

Inside the transmission housing 16 a cast metal gear case 30 serves as a main frame or support for the transmission which is essentially a rotary to reciprocation converting mechanism 32 (FIGS. 2, 3 and 4). The input portion of this mechanism is a speed reducing bevel gear set 34 in which an input pinion 36 (driven by the tool's electric motor, not shown), drives a relatively large diameter, shallow depth crown wheel 38. The crown wheel is journaled on a spindle 40, rigidly mounted in the gear case or frame 30, by a single short radial anti-friction bearing 42, one end of which is approximately flush with the upper or back face 44 of the crown wheel 38. The back face 44 of the crown wheel is relieved at its periphery to form a shoulder 46. A drive pin 48, mounted rigidly and eccentrically in the crown wheel 38, extends upwards from the back face 44 and carries an anti-friction bushing 50.

Forming a partial cover for the cast metal gear case 30, a flat generally Y-shaped yoke plate 52 (seen most clearly in FIG. 4) overlies the crown wheel 38 and extends forward to the forward end of the transmission housing 16. The yoke plate 52 is, in part, a dividing or separating wall, effectively dividing the transmission housing 16 into upper and lower spaces 53a, 53b containing the saw blade carrier 20 and the bevel gear set 34 respectively. The yoke plate 52 is necessarily notched or apertured to provide clearance for the eccentric pin 48 with bushing 50 which extend up through it (FIG. 2). The resulting form includes opposite arms 54, 56, defining, with a semi-circular root 58 a large open-ended notch 60. The stem 62 of the Y forms a floor for a forward bearing pocket 64 of the gear case 30. The form of yoke plate shown (in full line) in FIG. 4 provides clearance for the additional mechanism needed for an "orbital" blade action—to be described below. But, as a minimum, a circular opening or aperture as indicated in phantom at 66 is required to provide clearance for the eccentric drive pin 48.

An annular thrust ring 68 is carried loosely and concentrically on the shoulder 46 of the crown wheel 38. Its depth is such that it extends just proud of the back face 44 of the crown wheel. The thrust ring 68 may be of simple rectangular cross section as in the ring 68" of the embodiment of FIG. 7, but here a more complex form with an internal rib 69 is used. The widths of the bearing contact annulus 70 and the crown wheel shoulder 46 may be unequal and may be set or chosen independently so as to, for example, satisfy particular thrust bearing design parameters or crown wheel manufacturing optimization respectively.

The saw blade carrier 20 rides on top of the yoke plate 52. A forward saw blade carrier bar portion 72 extends forwardly through the gear case bearing pocket 64, and externally of the transmission housing 16. The inner end of the saw blade carrier bar 20 is in the form of a transverse yoke 74 with a symmetrical transverse oval slot 76, which receives the eccentric drive pin 48, surrounded by its bushing 50. The yoke portion 74 is of sufficient width that its opposite sides may engage and ride upon the parallel opposite arms 54, 56 of the yoke plate 52. A forward bearing or guide for the carrier bar stem portion 72 is defined by the yoke plate stem portion 62 (below) and an inverted U-shaped bearing member 78 (top and sides), which engages and is positioned by the bearing pocket 64 of the gear case 30.

A partially domed cover plate 80 (FIGS. 2 and 3) with an external shape and size similar to that of the yoke plate 52 forms a cover for the gear case 30 and includes offset opposite side wall portions 82, which engage the yoke portion 74 and cooperate with the inverted bearing 78 and the yoke plate (below) to guide and control the saw blade carrier 20 in its linear reciprocating motion. The domed top 84 provides running clearance for the eccentric pin 48. Suitable hardware such as machine screws 86 keep the yoke plate 52 and the cover plate 80 in register and secure them to the gear case 30.

In an alternative embodiment (FIG. 5), the form of the crown wheel 38' is as it would be in the first embodiment (FIGS. 1 to 4), if the thrust ring 68 was integral with the crown wheel 38. In this second embodiment, a thrust annulus or rim 90 stands proud of the gear back face 44' adjacent yoke plate 52'.

An even simpler flat-backed crown wheel design 38a, with no especial provision for limited or specific annular contact with the yoke plate 52a is shown in FIG. 6 in a third embodiment. Here the thrust bearing is established with a thrust ring 68a rigidly attached to the yoke plate 52a by a suitable means such as welding.

In a fourth embodiment, (FIG. 7), the environment of the invention has been augmented to include mechanism for imposing a secondary motion to the saw blade—a motion in the plane of the blade and transverse to the direction of reciprocation. The combination motion is usually called orbital. It requires a slight rocking of the saw blade carrier 20" and to facilitate, this the yoke plate 52" stops short of the bearing insert pocket 64", where a blade carrier linear bearing 78" is biased upward by a spring 94. The actuator for rocking the blade carrier is a rocker arm 96. The input for the motion is a cam surface or track 98 on the back face 44" of the crown wheel 38", immediately concentrically inside a peripheral shoulder 46" carrying a loose thrust ring 68". The "signal" to the rocker arm 96 is by way of a pivoted cam follower/lifter 100. The effective throw of the saw blade B in transverse motion is adjusted by rotation of cam pin 102 through an external control lever (not shown in the drawings). A smaller orbital-action arrangement is described in more detail in the patent to Moores referred to above.

The fifth embodiment illustrated in FIGS. 8, 9 and 10 is functionally similar to the embodiment of FIG. 2. Structurally it is simplified by the omission of any dividing or separating wall, corresponding to the yoke plate 52 of the first embodiment. Crown wheel 138 is now positioned by the direct engagement of saw blade carrier 120 with thrust ring 168 and hence the circumferential periphery or shoulder 146 of the crown wheel 138. In absorbing thrust forces from the crown wheel the saw blade carrier 120 is backed up and guided by the cover plate 180 rigidly secured to the transmission housing 130. Guide surfaces 182 and 183 of the cover plate 180 guide the reciprocating motion of the yoke portion 120b of the saw blade carrier. The stem or bar portion 120a of the saw blade carrier is guided by a square tubular linear bearing 178 retained in a bearing insert pocket 164 of the transmission housing 130.

In operation of the first embodiment (FIGS. 1-4), rotary power input through the pinion 36 rotates the crown wheel 30 so that the eccentric pin 48, oscillating in the slot 76 of the yoke 74 of the saw blade carrier bar 20, causes the saw blade carrier bar to reciprocate linearly guided by the insert bearing 78, the side walls 82 of the cover plate 80 and the upper surface of the yoke plate 52. Thus the yoke plate may be considered a guide or bearing plate for the saw blade carrier bar 20.

As can be seen from the drawings (FIG. 2 for example) the line of action from the thrust load imposed in the crown wheel 38 by the normal tendency of gears (such as pinion 36 and crown wheel 38) to separate under load, will fall substantially within the supported perimeter of the thrust ring 68. This will be true whether this effective thrust bearing arrangement for the crown wheel is used in conjunction with the open or notched yoke plate 52 (FIG. 4) or with the closed yoke plate having only a simple circular opening or aperture as indicated in phantom at 66 in FIG. 4. Thus, the thrust support for the crown wheel 38 provided by the thrust ring 68 bearing on the yoke plate 52 is inherently stable. Even with normal manufacturing tolerances, the opportunities for the crown wheel 38 to rock about its axis of rotation leading to relatively rapid wear rates in the gear teeth, crown wheel, radial bearing, etc., are, compared with the conventional crown wheel thrust bearing arrangements of Moores and O'Banion, proportionately greatly reduced due to the bigger radius of the effective bearing. As well as being inherently more stable this large effective diameter thrust bearing arrangement for the crown wheel may offer larger bearing surface area and long wear life for the crown wheel thrust bearing itself. And dimensional stability at that point prolongs the life of the crown wheel radial bearing and the gear teeth themselves through maintaining satisfactory gear mesh. In contrast, conventional arrangements (such as Moores and O'Banion) are inherently unstable, in large part due to the radially inward remoteness of the perimeter of their small diameter crown wheel thrust bearing surfaces from the meshing gears of the bevel gear set, and thus from the origin of the thrust loads.

In the gear case arrangement of the present invention, the crown wheel spindle 40, radial bearing 42, and the spindle mount in gear case 30, no longer have to sustain, in cantilever, the bending loads imposed by the thrust load on the crown wheel 38 by the gear forces. The yoke plate 52 substitutes as a gear case wall and provides an effective thrust surface for, and positions the crown wheel 38, through thrust ring 68, within the gear case. The yoke plate 52 thus has a dual bearing function—thrust bearing surface on one side, reciprocating sliding bearing surface on the other.

The thrust ring 68 in the first embodiment (FIGS. 1 to 4), "floats" on the shoulder 46 of the crown wheel 38 and may rotate with the crown wheel, or remain stationary with the yoke plate 52, or "walk" between the two, moving more slowly than the crown wheel. In any event it has been found that wear rates of the mating parts comprising the thrust bearing for the crown wheel are very low and simple lubrication arrangements are satisfactory. However an oil impregnated material may be advantageous for the thrust ring 68. The design flexibility offered by the ribbed cross section of the thrust ring 68 has been referred to above. But the rectangular cross section of thrust ring 68" of FIG. 7 is also efficient and economical. Other shapes may suit other applications.

Similar operational results and advantages are true for the second embodiment shown in FIG. 5, where, in effect, a thrust ring (thrust annulus 90) is integral with the crown wheel 38". Potential manufacturing cost reduction is an additional advantage here.

A further cost reduction and potential gain in compactness would result from using the flat-backed crown wheel 38a of FIG. 6 in direct contact with a yoke plate (52a). (This is not shown in the drawings). Given the presence of an aperture, such as 60 or 66a, in the yoke plate the contact of crown wheel with yoke plate is still only annular although wider (as can be seen in FIG. 6) than when a specific thrust ring is used. However this direct contact thrust bearing arrangement would be satisfactory for the thrust load and rotational speed of many power tools.

The third embodiment (FIG. 6) provides a fixed, specific annulus in combination with the simple flat-backed crown wheel 38a, a potentially low cost arrangement with the added advantage, when used with a notched yoke plate (such as 52 in FIG. 4) of providing 360 (continuous) bearing support for the crown wheel. A relatively thin thrust ring is shown but of course the ring could be thicker (or thinner) as desired, for particular space or bearing capacity requirements.

The invention is also compatible with the orbital drive embodiment of FIG. 7. The addition of the secondary motion to the saw blade B need do nothing to change the proportions and relationship of the principal drive components. The outside diameter of the thrust ring 68" may still approximate that of the crown wheel 38" with the cam follower 100 straddling or reaching in over the thrust ring to engage the cam track 98 on the back face 44" of the crown wheel. The relative proportions and functions of the crown wheel thrust and radial bearing arrangements remain as in the first embodiment, so that the same operational and functional advantages result.

The embodiment of FIGS. 8, 9 and 10 may be used for lighter duty reciprocating tools, and the structural simplification potentially reduces manufacturing cost. The advantages resulting from providing a large diameter annular thrust bearing remain generally as described above for the first embodiment. These advantages would obtain also for other configurations of thrust ring, such as those shown in FIGS. 5 and 7. The total effective bearing contact area between thrust ring 168 and saw blade carrier 120 is reduced compared with that between the thrust ring 68 and yoke plate 52, but the contact points between thrust ring and carrier substantially diametrically span the thrust ring in both the linear or longitudinal direction and the transverse direction so that stability of the bearing arrangement is insured. As may be seen particularly in FIG. 10, the width of the yoke portion 120b of the carrier 120 is substantially equal to the outside diameter of the thrust ring 168 so that contact between them is maximized as the carrier reciprocates.

In a power tool transmission with a speed reducing bevel gear set, such as a reciprocating power saw, the invention offers important durability and reliability advantages through the inventive step of removing the thrust bearing of the crown wheel from the conventional confined and cantilevered quarters exemplified by Moores and O'Banion, out beyond the swept diameter of the reciprocating drive pin to utilize the stable footing of an internal dividing wall or other extensive surface of the transmission. The arrangement maintains and potentially improves the compactness desired especially in hand held tools. An important contribution to compactness which has been maintained is having the crown wheel's back face, its effective thrust surfaces, and an end of its short radial bearing all substantially coplanar. In addition manufacturing is simplified and there is potential cost reduction. Possible additional cost of machining the crown wheel and of producing a thrust ring (if used) may easily be offset by the elimination of parts such as the retaining screw and thrust washer of the conventional designs and by a simpler spindle design. The feasibility of using wider manufacturing tolerances and lower strength materials inherent in absorbing the crown wheel thrust at a significantly increased diameter may also yield manufacturing cost savings.

I claim:

1. A reciprocating power saw transmission comprising:

a housing;

a saw blade carrier having at least an internal portion located within the housing for supporting a saw blade outside the housing;

guide means for guiding the saw blade carrier in generally linear reciprocating movement along an axis of reciprocation, including a bearing plate extending longitudinally within the housing and having opposite spaced apart first and second parallel surfaces, the first surface providing at least part of the guidance for the saw blade carrier;

reciprocating motion means located within the housing and including a speed reducing bevel gear set including an input pinion and an output crown wheel, said crown wheel being journaled by a radial bearing and rotating in a plane parallel and adjacent to the second surface of the bearing plate, and having a back face and carrying an eccentrically mounted drive element for engaging and generating reciprocating motion in the saw blade carrier; and thrust bearing means effective between the crown wheel and the bearing plate second surface, so that, in operation under load, when the input pinion is imposing an axial loading in the crown wheel, the axial loading is received by the bearing plate second surface.

2. The power saw transmission of claim 1 wherein the thrust bearing means comprises the direct engagement of at least a portion of the back face of the crown wheel with the second surface of the bearing plate.

3. The power saw transmission of claim 2 wherein the back face of the crown wheel includes a raised annulus for providing the engagement of the crown wheel with the bearing plate second surface, and the inside diameter of the annulus is substantially greater than the outside diameter of the radial bearing.

4. The power saw transmission of claim 3 wherein the outside diameter of the raised annulus is approximately equal to the outside diameter of the crown wheel.

5. The power saw transmission of claim 1 wherein the thrust bearing means comprises a thrust ring carried concentrically by the crown wheel back face for engaging the second surface of the bearing plate.

6. The power saw transmission of claim 5 wherein the thrust ring is free to rotate relative to the crown wheel.

7. The power saw transmission of claim 1 wherein the thrust bearing means includes a thrust annulus, and further including transverse motion means for imparting motion in the saw blade carrier transverse to the axis of reciprocation of said carrier, said transverse motion means including an annular cam track on the back face of the crown wheel and wherein said thrust annulus, and said cam track are concentrically adjacent.

8. The power saw transmission of claim 7 wherein the thrust annulus is concentrically outside the cam track of the crown wheel and adjacent the crown wheel perimeter.

9. The power saw transmission of claim 8 wherein the transverse motion means includes a cam follower pivoted to the housing at a pivot disposed radially outside the thrust annulus, the cam follower extending substantially radially across the thrust annulus into engagement with the cam track.

10. A reciprocating power saw transmission comprising:
    a housing;
    a saw blade carrier having at least an internal portion located within the housing for supporting a saw blade outside the housing;
    guide means for guiding the saw blade carrier in generally linear reciprocating movement along an axis of reciprocation including a cover plate extending at least partially within the housing and providing at least part of the guidance for the saw blade carrier;
    reciprocating motion means located within the housing and including a speed reducing bevel gear set, including an input pinion and an output crown wheel, said crown wheel being journaled by a radial bearing and rotating in a plane parallel to and adjacent to the saw blade carrier, and having a back face and carrying an eccentrically mounted drive element for engaging and generating reciprocating motion in the saw blade carrier; and
    thrust bearing means effective between the crown wheel and the carrier so that in operation under load, when the input pinion is imposing an axial loading on the crown wheel, the axial loading is received by the saw blade carrier.

11. The power saw transmission of claim 10 wherein the thrust bearing means comprises the direct engagement of at least a portion of the back face of the crown wheel with the carrier.

12. The power saw transmission of claim 11 wherein the engagement of the back face of the crown wheel is provided by an annular portion of the crown wheel and the inside diameter of the annular portion is substantially greater than the outside diameter of the radial bearing.

13. The power saw transmission of claim 10 wherein the thrust bearing means comprises a thrust ring carried concentrically by the crown wheel back face for engaging the saw blade carrier.

14. A reciprocating power saw transmission comprising:
    a housing;
    an elongated saw blade carrier having at least one generally planar side, at least an internal portion of the carrier being located within the housing for supporting a saw blade outside the housing;
    guide means for guiding the saw blade carrier in generally linear reciprocating movement along an axis of reciprocation in a plane parallel to the at least one generally planar side;
    an extensive surface within the housing defining a plane parallel to the plane of reciprocation and associated with the guiding of the saw blade carrier;
    reciprocating motion means located within the housing and including a speed reducing bevel gear set, including an input pinion and an output crown wheel, said crown wheel being journaled by a radial bearing and rotating in a plane parallel to and adjacent to the extensive surface and carrying an eccentrically mounted drive element for engaging and generating reciprocating motion in the saw blade carrier; and
    thrust bearing means effective between a portion of the crown wheel adjacent its circumferential periphery and the extensive surface so that in operation under load, when the input pinion is imposing an axial loading on the crown wheel, the axial loading is received by the extensive surface.

15. The power saw transmission of claim 14 wherein the extensive surface is provided by a fixed guide plate disposed between the crown wheel and the saw blade carrier.

16. The power saw transmission of claim 14 wherein the extensive surface is provided by a second generally planar side of the saw blade carrier, parallel and opposite to the first such side.

* * * * *